UNITED STATES PATENT OFFICE.

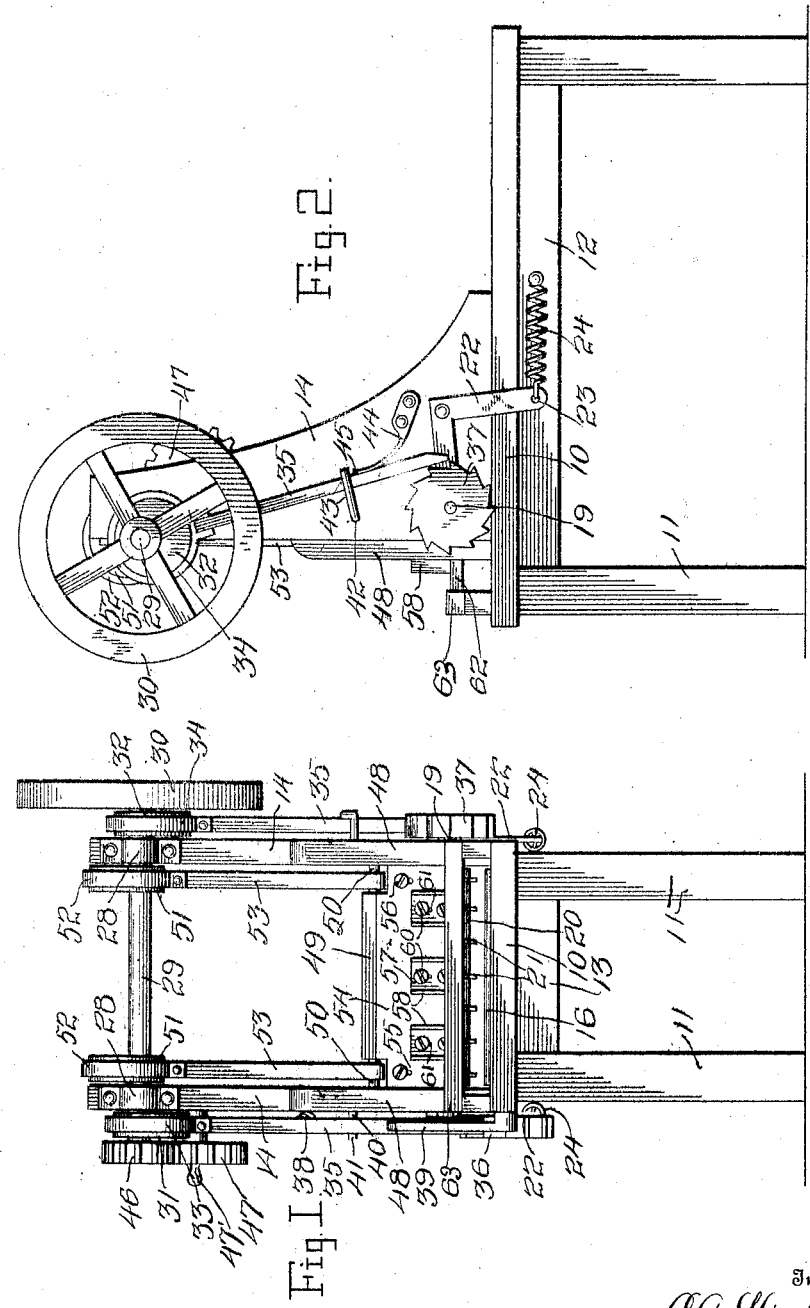

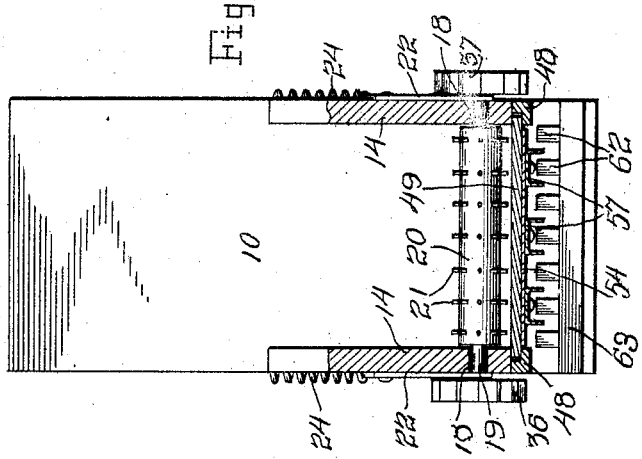
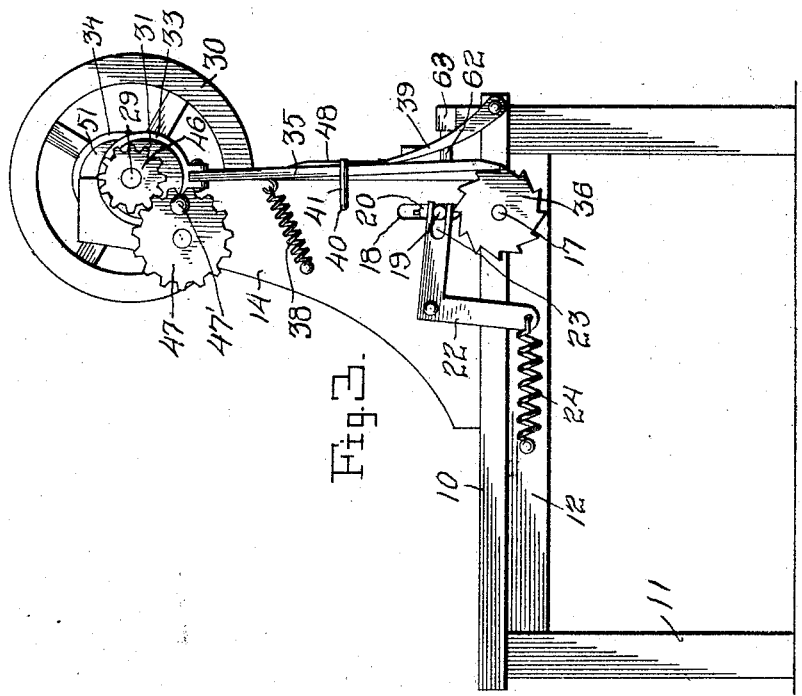

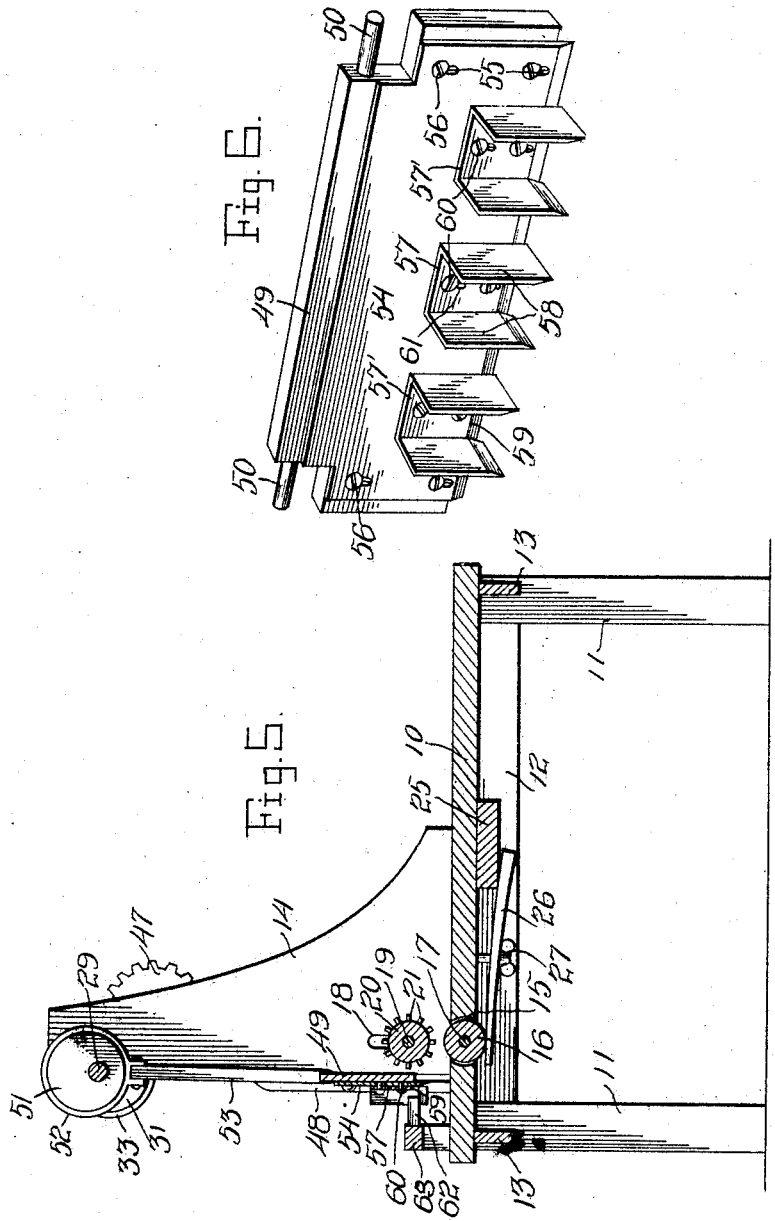

CLARENCE A. KRABILL, OF FOSTORIA, OHIO.

FAT-CUTTING MACHINE.

No. 901,624.  Specification of Letters Patent.  Patented Oct. 20, 1908.

Application filed June 5, 1906. Serial No. 320,359.

*To all whom it may concern:*

Be it known that I, CLARENCE A. KRABILL, a citizen of the United States, residing at Fostoria, in the county of Seneca, State of Ohio, have invented certain new and useful Improvements in Fat-Cutting Machines; and I do hereby declare the following to be a full, clear, and exact description of the invention, such as will enable others skilled in the art to which it appertains to make and use the same.

This invention relates to machines for cutting fat into blocks prior to the rendering process, the primary object of the invention being to provide a novel form of intermittent feed for the fat and a novel construction of knife which will in one movement cut a piece of fat into blocks of suitable size for the refining process.

A further object of the invention resides in the provision of a novel device for preventing sticking of the fat to the knives while they are on their upward stroke, thereby clogging the machine.

With the above and other objects in view, the present invention consists in the construction and arrangement of parts, shown in the accompanying drawings, in which:

Figure 1 is a front elevation of the machine. Fig. 2 is a side elevation of one side thereof. Fig. 3 is a similar view of the opposite side of the machine. Fig. 4 is a horizontal sectional view taken directly above the knife of the machine. Fig. 5 is a vertical longitudinal view through the machine, and, Fig. 6 is a detail perspective view of the knife of the machine.

Referring to the drawings, the machine comprises a table including a top 10 which is supported by means of legs 11 which are connected with the top and with the sides 12 and the ends 13 of the table. Mounted upon and extending upwardly from the top of the table 10 adjacent its forward end are standards 14. The top 10 of the table is slotted transversely as at 15 for the reception of a feed roll 16 which is mounted upon a shaft 17 having its ends extending slightly beyond the sides of the top of the table and the standards 14 are provided with alining vertically extending slots 18 in which are engaged the ends of a shaft 19 carrying a second feed roll 20 which is located directly above and in slightly spaced relation with respect to the roll 16. The roll 16 has its upper edge located in a plane slightly above the upper face of the table and as will be understood is fixed in this position, whereas the feed roll 20, which is provided with a plurality of teeth 21 is movable vertically in the standards to allow for passage of different thicknesses of fat between the rolls 16 and 20. In order to maintain a tension upon the roll 20 to normally hold it at its limit of movement toward the roll 16, I provide a pair of bell-crank levers 22 which are pivoted one to each of the standards 14 and which have one of their arms bifurcated as at 23 to receive the outer end of the shaft 19, there being springs 24 connecting the outer ends of the bell crank levers to the sides 12 of the table. In order to hold the roll 16 at a tension to prevent its turning too rapidly, I provide a block 25 which is secured to the underside of the top 10 of the table and against which bears one end of a brake-member 26, the forward end of the brake-member being preferably of less thickness than the rear end thereof in order that it may have some resiliency and the said brake member being held in proper position with the rear end bearing against the block 25 as stated and its forward end against the underside of the roll 16 by means of a thumb-screw 27 which is engaged through the said brake-member intermediate its ends and into the table top 10.

Mounted in suitable brackets 28 upon the standard 14 is a shaft 29 which is provided at one of its ends with a fly-wheel 30 and also with eccentric disks 31 and 32 which are located outwardly of the standard 14 and with which are engaged by eccentric straps 33 and 34 respectively including each an arm 35 which is arranged at its lower end for engagement with ratchet wheels 36 and 37, the arm carried by the strap 33 being disposed for engagement with the wheel 36 and the arm carried by the strap 34 with the arm 37. The ratchet wheels 36 and 37 are secured upon the shafts 17 and 19 respectively and outwardly of the standards 14 as will be readily understood and are arranged to intermittently rotate the said shafts and their respective feed rolls a predetermined distance when the shaft 29 is rotated. As shown in the drawings, the ends of the arms 35 engage the ratchet wheels relatively upon opposite sides so that the said feed rolls will be turned in opposite directions as will be readily understood. A spring 38 is connected at one of its ends to the arm 35 carried by the eccentric strap 33 and at its opposite end to the adjacent standard, the purpose of the spring being to hold the said arm in proper engagement with its respective ratchet wheel 36, the said arm being also held in this position by means of a spring finger 39 secured to the adjacent side of the top of the table and extending upwardly and rearwardly and bearing against the forward face of the arm 35. Extending laterally from the adjacent standards is a rod 40 which has its outer end portion bent forwardly at right angles as at 41 to prevent lateral movement of the said arm 35 and hence disengaging from the ratchet wheel 36 the rolls 16 and 20 are intermittently rotated. A similar guide member 42 is provided for the arm carried by the eccentric strap 34 and has a rearwardly extending portion 43 which holds the said last-named arm against lateral movement as in the case of the member 40. Secured to the side of the adjacent standard 14 is one end of a leaf spring 44 which has its opposite end arranged to bear against the rear face of the said arm as indicated at 45 to hold it in its proper position. In order that the shaft 29 may be rotated, I provide upon the said shaft at its end opposite the fly-wheel 30, a pinion 46 and journaled upon the adjacent standard, a gear wheel 47 which is provided with a crank-handle 47', by means of which the gear-wheel may be rotated, it being understood that it meshes with the pinion 46.

Secured to each of the standards 14 at their forward edges are guides 48 in which is mounted to slide vertically a plate 49 which plate is provided at its upper edge and at each side with a pintle 50 formed by recessing the said plate adjacent its upper end. Mounted upon the shaft 29 are eccentrics 51 with which are engaged by eccentric straps 52 from which lead arms 53, the said arms being provided at their lower ends with openings through which are engaged the said pintles 50.

A knife plate 54 is provided with slots 55 at intervals throughout its length through which are engaged set-screws 56 which have their ends engaged in the plate 49, the said knife plate 54 being thus adjustably mounted upon the plate 49. The lower edge of the knife plate 54 is sharpened to form a cutting edge as shown in the drawings, and it will be understood serves to cut the fat transversely as it is fed beneath the same. In order to cut the fat longitudinally and into blocks, I provide the three sided knife blades 57 which include each a connecting portion and spaced portions 58 which extend at right angles to the portion 57 and in spaced relation to each other, the lower edges of the spaced portions being sharpened to form a cutting edge while the lower edge of the connecting portion is located in a plane above the said lower edges of the spaced portions 58 as indicated at 59. The said blades are secured adjustably upon the knife plate 54 by means of set-screws 60 which are engaged through slots 61 formed in the said blades and in threaded openings in the said knife plate 54, there being preferably a pair of slots formed in each of the connecting portions and a set-screw engaged through each slot as will be readily understood. From the foregoing it will be seen that the main knife blade 54 which cuts the fat transversely and the blades 57 which cut it longitudinally are adjustable vertically to allow for wear and to accommodate the machine to various circumstances. In order to prevent the blocks of fat from sticking to the blades 57, I mount upon the top of the table and in spaced relation thereto, a bar 63 from which extend rearwardly fingers 62, the said fingers being arranged to lie one between each of the blades 58 and one at each end of the series of blades, the said fingers serving to hold the fat against upward movement with the plate 49 and its blade as will be readily understood.

It will be noted that the eccentrics 31, 32 and 51 are so positioned upon the shaft 29 that when the plate 49 and its blade is being removed upwardly, the arms 35 will be on their down stroke to actuate the feed rolls, it being understood that the said feed rolls are only rotated during the up stroke of the said plate and that the feed mechanism ceases to operate as soon as the plate starts on its downward stroke.

What is claimed is:

In a machine of the class described, a table, an intermittently actuated feeding mechanism comprising an upper and a lower roll, a ratchet wheel on one end of each roll, said ratchet wheels having oppositely directed teeth, a rotatable shaft parallel to said rolls, a pair of eccentrics spaced apart upon said shaft, spring pressed pawl arms arranged to be operated by said eccentrics and respectively engaging said ratchet wheels, a reciprocating cutter, a second pair of eccentrics mounted upon said shaft, and operating means connected between said second pair of eccentrics and said reciprocating cutter.

In testimony whereof, I affix my signature, in presence of two witnesses.

CLARENCE A. KRABILL.

Witnesses:
HIRAM KRABILL,
CURTIS GUERNSEY.